(12) United States Patent
Österling (10) Patent No.: US 8,509,839 B2
(45) Date of Patent: Aug. 13, 2013

(54) TRANSMISSION APPARATUS

(75) Inventor: Jacob Österling, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 65 days.

(21) Appl. No.: 13/122,835

(22) PCT Filed: Dec. 16, 2008

(86) PCT No.: PCT/SE2008/051474
§ 371 (c)(1),
(2), (4) Date: Apr. 6, 2011

(87) PCT Pub. No.: WO2010/042000
PCT Pub. Date: Apr. 15, 2010

(65) Prior Publication Data
US 2011/0195681 A1    Aug. 11, 2011

Related U.S. Application Data

(60) Provisional application No. 61/103,269, filed on Oct. 7, 2008.

(51) Int. Cl.
*H04B 7/005* (2006.01)

(52) U.S. Cl.
USPC .......................... 455/522; 455/561; 455/127.1

(58) Field of Classification Search
USPC ............. 455/103, 127.1, 127.4, 550.1, 553.1, 455/552.1, 561, 522
See application file for complete search history.

(56) References Cited

U.S. PATENT DOCUMENTS

| | | | | |
|---|---|---|---|---|
| 6,477,388 | B1 * | 11/2002 | Schmutz | 455/522 |
| 6,662,018 | B1 | 12/2003 | Kintis et al. | |
| 6,819,909 | B1 * | 11/2004 | Hiramatsu | 455/69 |
| 2002/0115460 | A1 * | 8/2002 | Rune et al. | 455/522 |
| 2009/0170472 | A1 * | 7/2009 | Chapin et al. | 455/410 |

* cited by examiner

*Primary Examiner* — Blane J Jackson (57) ABSTRACT

A method of amplifying signals for transmission includes generating a signal in each of a plurality of subsystems. The subsystems each implement one of a plurality of radio access networks such that at least two different radio access networks are implemented. The method further includes amplifying signals generated by the subsystems with a power amplifier capable of amplifying input signals to a maximum power. The method also includes generating in each subsystem a power demand indicative of a power requested by that subsystem. Additionally, the method includes assigning a portion of the maximum power to each subsystem based upon the demands.

20 Claims, 3 Drawing Sheets

TRANSMISSION APPARATUS

This application claims the benefit of U.S. Provisional Application No. 61/103,269, filed Oct. 7, 2008, the disclosure of which is fully incorporated herein by reference.

TECHNICAL FIELD

This invention relates to transmission apparatus, such as may be used in, for example, radio base stations for radio access networks.

BACKGROUND

It is known to provide a single power amplifier for multiple different standards of radio access network (RAN) in a radio base station (RBS) so as to provide a Multi-standard Radio (MSR) power amplifier or a Multiple Carrier Power Amplifier (MCPA). The assignment of power between the different RANs has previously been a fixed proportion of the maximum power of the power amplifier for each RAN.

However, this does not represent an optimal use of the power amplifier. The amplifier is an expensive part of the RBS and over-dimensioning is not economically plausible. The amount of transmitted power can be directly translated to the capacity of the cell served by the transmitter. By making more efficient use of the maximum power available from a power amplifier, the size of the cell it could serve will be increased.

SUMMARY

According to a first aspect of the invention, there is provided a transmission apparatus comprising:
- a power amplifier, having an input and an output, the power amplifier being arranged so as to amplify signals input at its input and output the amplified signals at its output for onward transmission, the power amplifier being capable of amplifying input signals to a maximum power;
- a plurality of signal generating subsystems, which are arranged so as to each provide, in use, a signal to be amplified to the input of the power amplifier; and
- a power control circuit, arranged to assign a portion of the maximum power to each subsystem for amplification of each subsystem's signal;
- in which each subsystem is arranged to provide the power control circuit with a power demand indicative of the power required by that subsystem, and in which the power control circuit is arranged to vary the assignment of each subsystem's portion based upon the demands.

This therefore represents a more efficient use of the power available from the power amplifier than previously had been achievable in the situation where each subsystem was provided with a fixed proportion of the maximum power. The inventors have realised that it is possible to vary the power assigned to each subsystem in use.

The signals of the subsystems may each have a different baseband (that is, the set of frequencies over which they transmit). The apparatus therefore would implement a Multi Carrier Power Amplifier (MCPA). Alternatively, the subsystems may each implement one of a plurality of radio access networks (RANs) such that at least two different radio access networks are implemented. The radio access networks may comprise at least two of GSM (Global System for Mobile communications), WCDMA (Wideband Code Division Multiple Access) and LTE (Long Term Evolution, as generated by the Third Generation Partnership Project, 3GPP). Thus, a multi-standard radio (MSR) apparatus can be defined.

The power control circuit may be arranged to assign a minimum power to each subsystem. Thus, a base level of power is guaranteed.

Each subsystem may be arranged such that the demand it makes in use comprises at least two portions, each portion being indicative of the power required to send a subset of the signals in that subsystem's signal. The power control circuit may be arranged such that it gives priority to one of the portions from each of the subsystems over the others. This allows the most important signals to be transmitted from all of the subsystems in priority to the less important ones.

As such, each of the subsystems may be arranged such that a first portion of its demand comprises at least one of an indication of the power required to transmit any control signalling required in its signal and any circuit switched traffic (for example voice traffic) in its signal. Control signalling is important, because it is that that enables the remaining data to be transmitted, connections to be set up, nodes to join or leave the respective networks and so on. Circuit switched data requires a high level of continuity of connection, and so is also important. As such, the power control circuit may be arranged to give priority to the first portions of each subsystem.

The demands of each of the subsystems may also comprise a second portion, which comprises an indication of the power required to transmit packet switched data in its signal. Packet switched data is more tolerant of disruption than circuit switched data, and so the power control circuit may be arranged to give priority to the power demands indicated in the first portions to those in the second portions.

As such, the power control circuit may be arranged so as to attempt to fully assign the power indicated by the portion to which it gives priority for each subsystem and assign the remainder of the maximum power based upon the other portions. However, if the total of all the powers indicated by the portions to which it gives priority are more than the maximum power, the power control circuit may be arranged to send a "maximum power exceeded" indication to the subsystems. The power control circuit may also be arranged to send a "maximum power exceeded" indication to a subsystem that indicates in the portion to which the power control circuit gives priority a power greater than a predetermined limit per subsystem. In response to such a "maximum power exceeded" message, the subsystems may be arranged so as to apply congestion control to the traffic in their signal, so as to reduce the amount of power required by the traffic to which the portion refers.

Each subsystem may be arranged so as to indicate, in the portions relating to packet switched data, a ranked set of demands for traffic of different levels of priority to the subsystem. For example, a portion may be provided for high priority traffic, medium priority traffic and low priority traffic. The power control circuit may be arranged to assign power to higher priority traffic from each subsystem, with the remainder remaining after each level of priority traffic being assigned to the next highest priority traffic, until the maximum power is reached or all of the power demands are satisfied.

Each subsystem may be arranged to estimate the power it requires based on the traffic it is to transmit, typically classified according to the portions in the demands. In one embodiment, a or each subsystem may comprise an area of memory arranged to act, in use, as a queue for data to be transmitted by that subsystem; in such a case that subsystem may be arranged so as to, in use in order to create the demand, analyse the contents of the queue and calculate for the traffic relating to each portion the power required to transmit that traffic based upon such exemplary parameters as the link adaptation required and the size of the queue. In another embodiment, the estimated power may be a function of needed power for transmission in previous power reporting periods from that subsystem, e.g. a function adapting to the history of the traffic load.

The power control circuit will typically be arranged to indicate to each of the subsystems the level of power that has been assigned to that subsystem. This value may be given as a total power, the excess power over the minimum power, or broken down by the power assigned to each portion of the demand.

Each subsystem may be arranged such that, if a subsystem is assigned less power than indicated in its demand, it modifies the traffic it transmits to fit into the assigned power. Accordingly, in such a case the subsystems may be arranged to remove users, or to decrease the power transmitted to all or a subset of the users of the subsystem. In one embodiment, the subsystem may simply reduce the power of all of its signals by the proportion of the desired power that has not been assigned to the subsystem—so, for example, if the subsystem was assigned only 90% of its demand, then the subsystem may reduce the power with which it transmits all of its signals by 10%.

The apparatus may be arranged such that the demands are sent to the power control circuit by the subsystems and the assignments made by the power control circuit repeatedly. Typically, the period of this repeating cycle would be less than 50 milliseconds, and typically less than 20 milliseconds. Thus, the apparatus can efficiently assign the power to the subsystems based on the ebb and flow of data.

The apparatus may form a radio base station. The apparatus may further comprise a transmission antenna coupled to the output of the power amplifier.

According to a second aspect of the invention, there is provided a method of amplifying signals for transmission, comprising:
  providing a power amplifier, the power amplifier being capable of amplifying input signals to a maximum power;
  providing a plurality of signal generating subsystems;
  generating, in each subsystem, a signal;
  amplifying each signal using the power amplifier;
  generating in each subsystem a power demand indicative of the power required by that subsystem; and
  assigning and varying a portion of the maximum power to each subsystem based upon the demands.

This therefore represents a more efficient use of the power available from the power amplifier than previously had been achievable in the situation where each subsystem was provided with a fixed proportion of the maximum power. The inventors have realised that it is possible to vary the power assigned to each subsystem in use.

The signals of the subsystems may each have a different baseband (that is, the set of frequencies over which they transmit). Alternatively, the subsystems may each implement one of a plurality of radio access networks (RANs) such that at least two different radio access networks are implemented. The radio access networks may comprise at least two of GSM (Global System for Mobile communications), WCDMA (Wideband Code Division Multiple Access) and LTE (Long Term Evolution, as generated by the Third Generation Partnership Project, 3GPP).

The method may comprise assigning a minimum power to each subsystem. Thus, a base level of power is guaranteed.

Each demand may comprise at least two portions, each portion being indicative of the power required to send a subset of the signals in that subsystem's signal. The method may comprise giving priority to one of the portions from each of the subsystems over the others. This allows the most important signals to be transmitted from all of the subsystems in priority to the less important ones.

A first portion of each demand may comprise at least one of an indication of the power required to transmit any control signalling required in the subsystem's signal and any circuit switched traffic (for example voice traffic) in its signal. Control signalling is important, because it is that that enables the remaining data to be transmitted, connections to be set up, nodes to join or leave the respective networks and so on. Circuit switched data requires a high level of continuity of connection, and so is also important. As such, the method may comprise giving priority to the first portions of each demand.

The demands of each of the subsystems may also comprise a second portion, which comprises an indication of the power required to transmit packet switched data in its signal. Packet switched data is more tolerant of disruption than circuit switched data, and so the power control circuit may be arranged to give priority to the power demands indicated in the first portions to those in the second portions.

As such, the method may comprise attempting to fully assign the power indicated by the portion to which priority is given for each subsystem and assigning the remainder of the maximum power based upon the other portions. However, if the total of all the powers indicated by the portions to which priority is given are more than the maximum power, the method may comprise sending a "maximum power exceeded" indication to the subsystems. The method may also comprise sending a "maximum power exceeded" indication to a subsystem that indicates in the portion to which the power control circuit gives priority a power greater than a predetermined limit per subsystem. In response to such a "maximum power exceeded" message, the subsystems may apply congestion control to the traffic in their signal, so as to reduce the amount of power required by the traffic to which the portion refers.

The demands may include, in the portions relating to packet switched data, a ranked set of demands for traffic of different levels of priority to the subsystem. For example, a portion may be provided for high priority traffic, medium priority traffic and low priority traffic. The method may comprise assigning power to higher priority traffic from each subsystem, with the remainder remaining after each level of priority traffic being assigned to the next highest priority traffic, until the maximum power is reached or all of the power demands are satisfied.

The method may comprise estimating, in each subsystem the power that subsystem requires based on the traffic it is to transmit, typically classified according to the portions in the demands. In one embodiment, at least one of the subsystems may analyse the contents of a queue for data to be transmitted by that subsystem and calculate for the traffic relating to each portion the power required to transmit that traffic based upon such exemplary parameters as the link adaptation required and the size of the queue. The history of transmission from that subsystem may also be used.

The method may comprise indicating to each of the subsystems the level of power that has been assigned to that subsystem. This value may be given as a total power, the excess power over the minimum power, or broken down by the power assigned to each portion of the demand.

Each subsystem may, if that subsystem is assigned less power than indicated in its demand, modify the traffic it transmits to fit into the assigned power. Accordingly, in such a case the subsystems may remove users, or decrease the power transmitted to all or a subset of the users of the subsystem. In one embodiment, the subsystem may simply reduce the power of all of its signals by the proportion of the desired power that has not been assigned to the subsystem—so, for example, if the subsystem was assigned only 90% of its demand, then the subsystem may reduce the power with which it transmits all of its signals by 10%.

The method may comprise the steps of generating the demands and assigning the power repeatedly. Typically, the period of this repeating cycle would be less than 50 milliseconds, and typically less than 20 milliseconds. Thus, the method can efficiently assign the power to the subsystems based on the ebb and flow of data.

DETAILED DESCRIPTION

Figure 1:
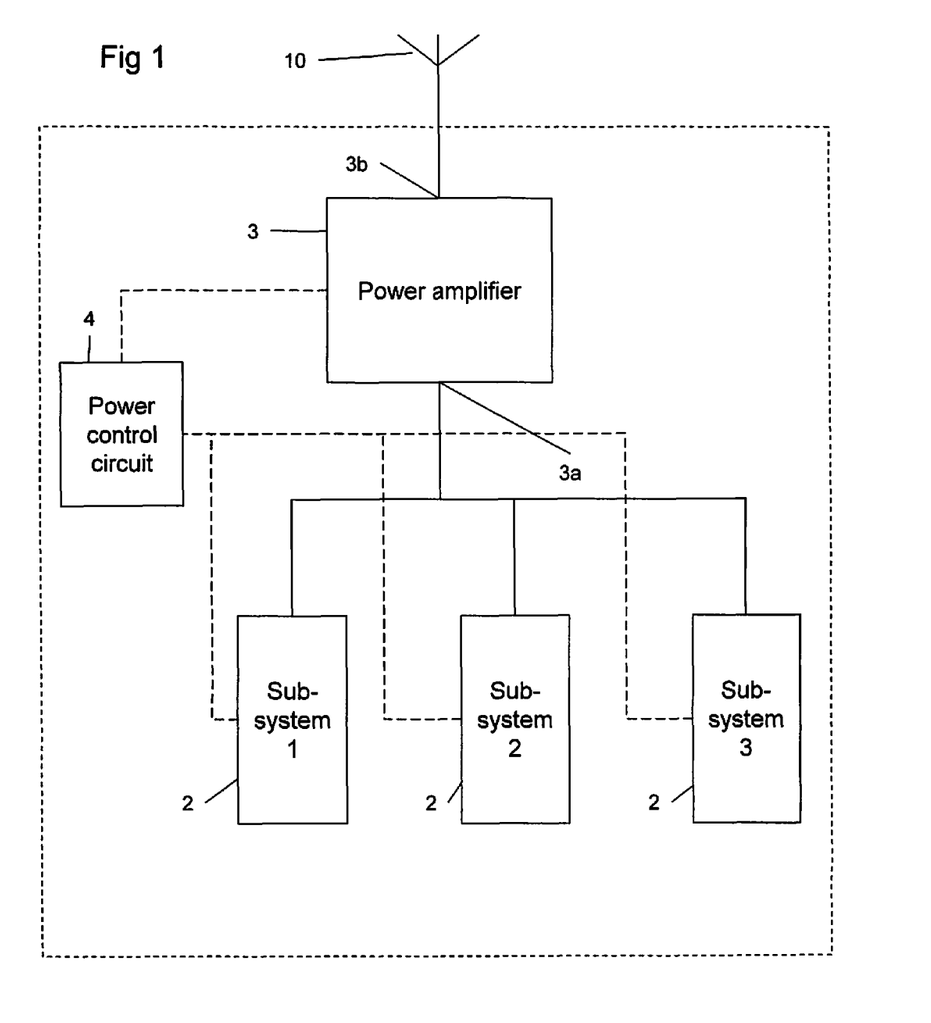
FIG. 1 a schematic diagram of a transmission apparatus according to a first embodiment of the invention.

A transmission apparatus 1 forming a radio base station (RBS) according to a first embodiment of the invention can be seen in FIG. 1 of the accompanying drawings. This transmission apparatus comprises a plurality of signal generating subsystems 2, which each generate a signal for transmission. It also comprises a power amplifier 3 which takes at its input 3a the signals from the subsystems 2, amplifies them and passes them to its output 3b. The output is connected to an antenna 10 (not part of the apparatus) in order to transmit the amplified signals.

The apparatus is further provided with a power control circuit 4, which connects via control channels (shown as dotted lines) to the subsystems 2 and the power amplifier 3. The power control circuit dynamically assigns a portion of the maximum power of the power amplifier 3 to each subsystem 2 so as to vary the share of the maximum power that the subsystems between them obtain. As will be described below, this assignment is in response to dynamic demands raised by the subsystems.

Each of the subsystems may implement a radio access network (RAN); the subsystems may share carriers or each have their own baseband. Examples of the types of RANs that may be provided include GSM (Global System for Mobile communications), WCDMA (Wideband Code Division Multiple Access) and LTE (Long Term Evolution, as generated by the Third Generation Partnership Project, 3GPP). As an example, we will discuss various potential combinations of the above networks. In the examples below, a subsystem is provided for each of the networks discussed.

WCDMA and LTE

The system can be described as two Radio Equipment Controllers (REC; that is, the subsystems 2) sharing the same Radio Equipment (RE; the power amplifier 3). Each subsystem 2 contains one or more schedulers, which are aware of the power usage of one or more carriers served by that subsystem 2. The schedulers communicate with a Scheduler controller (SCH Ctrl; the power control circuit 4), which shares the power of the amplifier 3 between the subsystems 2.

In such a case, each of the subsystems follows the method discussed below with reference to FIG. 2a, and the power control circuit follows the method discussed below with reference to FIG. 2b. As can be seen from the Figures, the algorithms are cyclic, and the two methods will cycle at the same rate. The algorithms cycle at an interval suitable for the application. Different periods can therefore be optimal for the different RANs. For WCDMA and LTE, a suitable period can be 10 ms.

As input parameters, each subsystem and the power control circuit is aware of the maximum power of the power amplifier and a guaranteed minimum power that will be assigned to that subsystem regardless of any demand.

Also, each subsystem and the power control circuit are aware of each other's time bases, or a common time base, such as the Common Public Radio Interface (CPRI) time base.

Figure 2A:
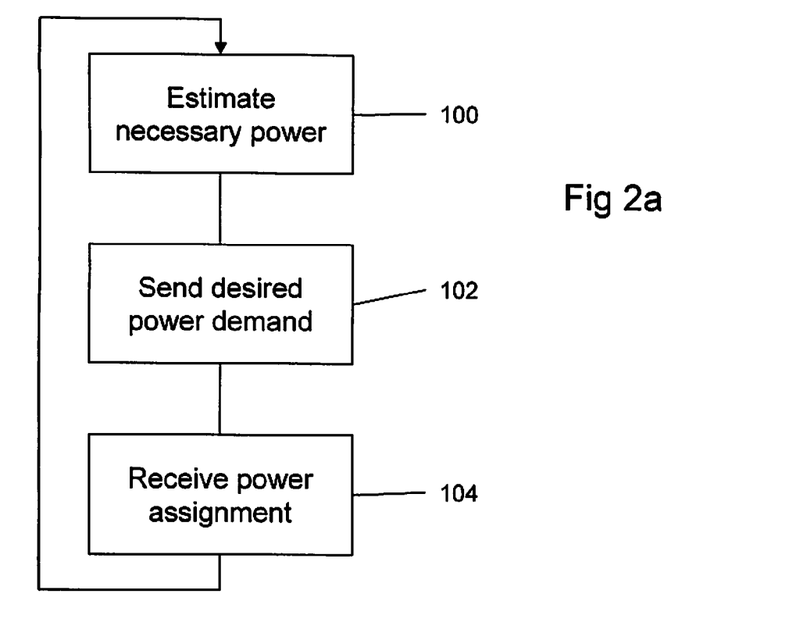
FIG. 2a shows a flowchart showing the basic algorithm carried out by the subsystems of the transmission apparatus of FIG. 1.

Taking the subsystems 2 and hence FIG. 2a first, the first step 100 is to estimate the necessary power for the coming time period.

Generally, three types of traffic are run through a system:
Control signalling, such as Broadcast Control Channel (BCCH).
Circuit switched traffic, such as voice.
Packet oriented traffic, such as High-Speed Downlink Packet Access (HSDPA).

The operating point of the algorithm is that the power for control signalling and circuit switched traffic is fulfilled and that the instantaneous power for packet oriented traffic is calculated and divided among the systems/carriers.

The estimation of necessary power is divided into two parts:
Each system estimating the necessary power to transmit for the time period—the common channels and the circuit switched channels. If this power is above the PA capabilities or the allowed power for one system, congestion control is applied by that system, and the power of that system is limited by the system itself.
Each system estimates the desired power based on the data in the priority queues. The desired power is can be estimated in different ways:
Most complex and best: Go through each priority queue; calculate its priority weight, its link adaptation, its size and thus the necessary transmit power.
Least complex: Track history and check with queue sizes—gives estimate of necessary transmit power.
Each system, at different instants in the processing, can proceed as follows:
Each scheduling interval, more users than it is possible to transmit to are evaluated, e.g. a factor of 2 more. This will, at the end of the scheduling processing, give information about the probable scheduling decision for next scheduling interval (may be changed due to new packets arriving on queue with higher priority).
At the beginning of the scheduling processing, when queues are sorted according to priority, an estimate of the necessary transmit power for each queue is estimated using the queue size and the last known link adaptation (power/bit) used for the user.

Each system sorts its estimated power according to the priority of the transmissions:
Necessary power: As described above
High priority: Part of packet transmission with priority weight>w1

Medium priority: Part of packet transmission with priority weight<=w1, >w2

Low priority: Part of packet transmission with priority weight<=w2

Where the priority weight for a packet is based on the quality of service (QoS) contract for that user and the history of that packet and that queue: a high weight if the QoS requires the packet to be sent and a low weight if the packet can be delayed a while longer.

W1 and w2 are configured per system, as predetermined thresholds.

After the power is estimated, the subsystem creates a demand and, at step 102, transmits it to the power control circuit 4.

In the demand, the estimated power is split into five categories:

Guaranteed power: The part of necessary power (or necessary and packet power) smaller than the guaranteed minimum power.

Wanted power: The remaining part of the necessary power.

Packet High: The remaining part of the High priority packet power.

Packet Mid: The remaining part of the Medium priority packet power.

Packet Low: The remaining part of the Low priority packet power.

Herein, the remaining power is the power of the priority minus whatever was accounted in the guaranteed power.

As an example, each category can be expressed as power in e.g. 10 mW, within the range of 0 W and 100 W, i.e. a 16 bit value. A desired power message can then constitute of the fields:

RAN/carrier—that is, the subsystem creating the demand: 4 bit

Antenna branch (power amplifier)—that is, an identifier for the power amplifier to be used, which is useful where multiple power amplifiers are employed: 6 bit 5 different power levels: 5*16 bit=80 bit A total of 90 bits per demand is then needed.

The worst case latency can be calculated as follows:

Assume a huge WCDMA RBS with 6 sectors, 4 carriers per sector and 2 antenna MIMO (multiple in multi out). With 4 carrier power amplifiers, this would consist of 12 power amplifiers.

Assume that all desired power messages are transmitted over the same control interface, i.e. one power control circuit for all power amplifiers.

If all carriers operate synchronously, all desired power messages are transmitted at the same time resulting in 48 messages being output to the interface.

Assuming the information is exchanged over a 100 Mbps interface, a worst-case latency (last message to be conveyed) becomes 50 microseconds. At an algorithm time interval of 10 ms, this is insignificant.

At step 104, each subsystem 2 receives information about the power it has been assigned by the power control circuit 4 for the duration of the algorithm time interval. The method by which the power control circuit 4 calculates this will be explained below. The indication of the assigned power comprises:

The guaranteed power of each system and carrier, including its own

The ratio of the remaining power given to its own carriers

The power amplifier total power

If two subsystems are set up with a 40 W power amplifier, and the carriers are given 10 W each as guaranteed power, and a given subsystem 2 is given 70% share (i.e. fractionally 0.7), it can schedule 10+0.7*(40−10−10)=24 W.

Figure 2B:
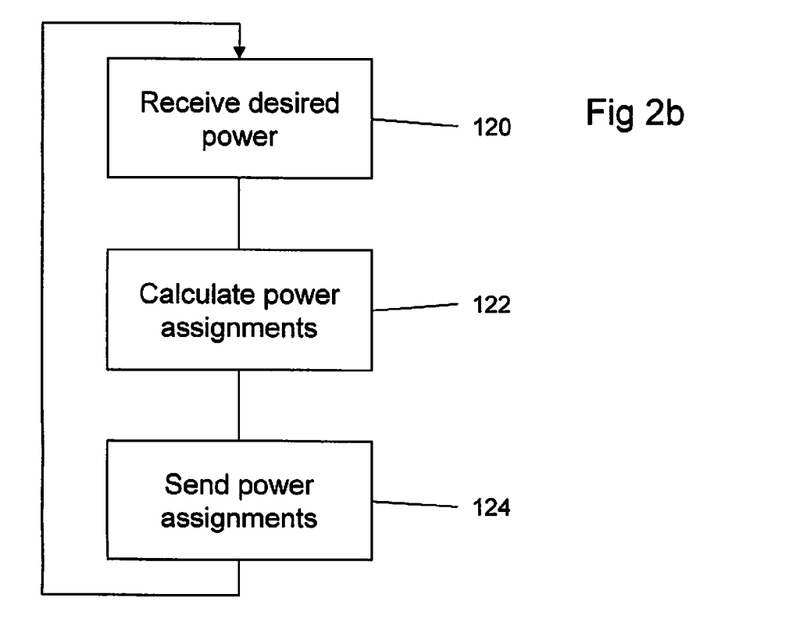
FIG. 2b shows a flowchart showing the basic algorithm carried out by the power control circuit of the transmission apparatus of FIG. 1.

Turning now to FIG. 2*b* and the power control circuit 4, in step 120, the power control circuit 4 receives the power demands from the different subsystems 2. The power control circuit 4 is also informed of any priority between the subsystems 2, and the power amplifier 3 capabilities.

At step 122, the power control circuit 4 calculates the optimal power sharing between the subsystems 2 based on the demands received from the subsystems implementing step 104, including the following steps:

1. Assign, and decrease the remaining available output power by, the guaranteed power requested for each subsystem 2. If the available output power is not sufficient, the power is allocated in order of priority. Not that this should be a fault scenario as the guaranteed power should always be available—the power amplifier, in a well specified system, should be deployed which ensures a guaranteed bit rate, at least sufficient to maintain common channel transmissions such as BCCH.

2. Divide any remaining power according to a strict priority between the types of traffic. An attempt is made to assign fully the highest priority demand out of the remaining available power; with the remainder forming the remaining available power for the next highest priority demand, and so on.

3. Calculate the share each system has received in step 2.

At step 124, the guaranteed power for all subsystems 2 and the power share for the specific subsystem 2 are sent to each subsystem 2. The time period for which the assignment is valid is also included.

Figure 3:
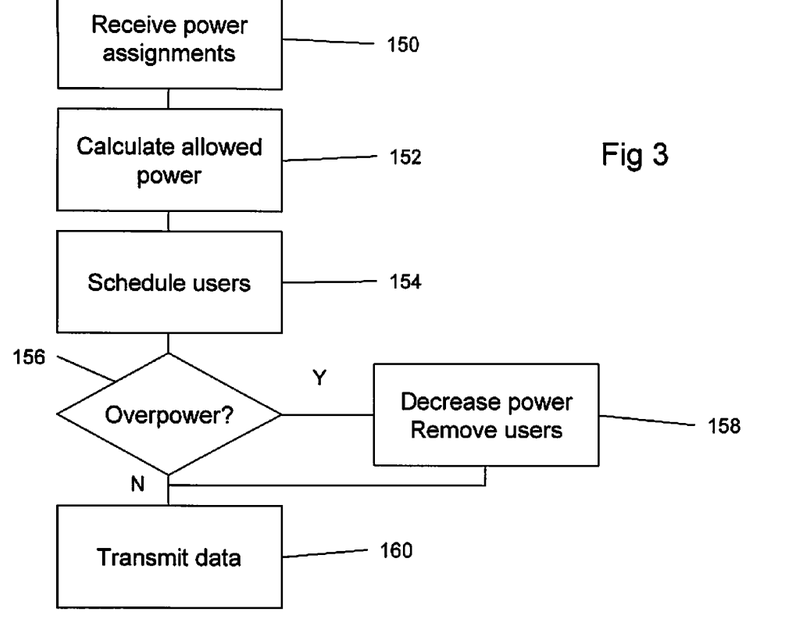
FIG. 3 shows a flowchart showing the steps carried out by the subsystems of FIG. 1 on receiving the power assignments.

The functioning of the subsystem 2 when it has received its assignment (step 104) can be seen in more detail in FIG. 3 of the accompanying drawings.

The initial step of receiving the assignment is shown in FIG. 3 as step 150. The subsystem 2 is informed about the power it is allowed to use during the coming time period. The received power share must be received well before the start of the scheduling processing of the first TTI within the time period for which the power allocation is valid. The scheduling processing time and the TTI duration for WCDMA is altogether 4 ms. The corresponding time for LTE is 3 ms. In the general solution, also including a GSM subsystem 2, each subsystem 2 will also receive the powers assigned to the other subsystems 2. From the information in the assignment, the subsystem 2 can calculate the power assigned to it (step 152).

Within one cycle of the algorithm shown in FIGS. 2*a* and 2*b*, many air interface transmission time intervals (TTI) occur. For each TTI, a selective number of users are chosen, according to a priority specific for each subsystem. At selection of users, the subsystem 2 is informed about how much power is available for packet traffic. This is based on:

Power allocated to the carrier

Power assumed used for control channels and circuit switched traffic on the same carrier.

The subsystem schedules, at step 154, at least as many users as the power allows.

As late as possible in the preceding TTI the power usage for the next TTI is evaluated. A check (step 156) is made whether the power usage for the control channels, the circuit switched traffic and the scheduled traffic exceeds the power derived in step 152, a local action is taken by the subsystem 2.

In such a situation (step 158), the power used by the carrier can be decreased either by removing users (e.g. a packet transmission) or by decreasing the power of one or more users. Another example can be to scale the power of all data and circuit switched traffic equally, to fit the power budget.

Finally, at step 160, the data, possibly scaled to fit the power budget, is output from the subsystem 2 to the power amplifier 3.

GSM and WCDMA/LTE

The algorithm described above is extendable to also include GSM. GSM has some different characteristics to the other RANs:

- The power of the circuit switched users is controlled by the base station controller (BSC).
- The power of the packet data users is controlled by the Packet Control Unit (PCU) which is often located in the BSC.
- The power is changed in a slow pace per user but since the users are time multiplexed the power need of the GSM system fluctuates very fast.
- The discontinuous transmission (DTX) function selects from time to time when to omit to transmit to a UE. The DTX is unpredictable, but is used up to 50% of the time.

Since the BSC is seldom located at the RBS site, it is impossible to include the BSC in the fast power sharing (10 ms basis). Instead, the algorithm shall focus on utilizing the power left by the GSM system as efficiently as possible.

The system is extended with a GSM radio base station (RBS) as one of the subsystems 2. The transceiver control is a function in the GSM RBS which has the knowledge and control of the power usage at a certain time slot of the GSM transceivers. The transceiver Controller sends the information to the other subsystems 2 and the power control circuit 4.

The GSM algorithm is run every time slot. It can be seen in FIG. 4 of the accompanying drawings. The remaining subsystem can utilise the method of FIG. 2a.

Figure 4:
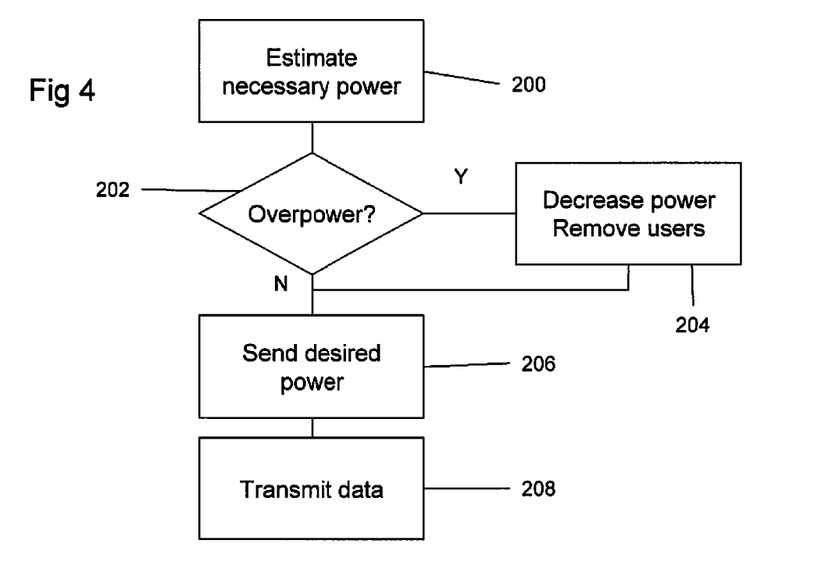
FIG. 4 shows the steps carried out by a GSM subsystem in a transmission apparatus according to an embodiment of the invention.

In step 200, the GSM RBS estimates the necessary output power for the transceivers using a certain power amplifier. The estimation shall be valid long enough into the future for being useful for the power control circuit to take into account in their scheduling decision. Because of the relative length of the scheduling and TTI period in WCDMA and the size of the transmission timeslots in GSM, sharing with WCDMA requires that the estimation is done at least 8 timeslots (4.6 ms) ahead. For the same reasons, power sharing with only LTE, the horizon can be shrunk to 7 timeslots (4.03 ms).

The horizon over which the power is known is based on a few different parameters:

- The downlink BB processing latency. The GSM system is tuned to have as little latency as possible. The GSM RBS thus knows the power as late as possible to still being able to apply it to the transmission. Therefore the downlink BB processing latency is the shortest time in advance a power change is known. The latency is less than 3 ms in state of the art GSM RBSs.
- Where in the BSC power control period the GSM RBS is. The output power of a GSM call is constant within a BSC power control period (about 500 ms) and all but the first frame within such a period can therefore be known more than the downlink BB processing time in advance.
- The Enhanced Data Rate GPRS (EGPRS) transmission have constant output power for 4 time slots, and all but the first frame within such a period can therefore be known more than the downlink BB processing time in advance.
- If discontinued transmission (DTX) is used or not. In DTX, the speech coder can signal to the GSM DL BB processing that it shall not output any data at all (since the caller is silent).

To fulfil the requirement of an estimation valid for at least 4.6 ms, the most straightforward solution is to introduce an artificial BB DL processing latency of another 2-3 ms. Alternatively, the GSM baseband predicts the power usage 2 to 4.6 ms. This works fine for circuit switched (known always except for the first frame of a BSC power control frame), and could be a good solution if the packet control unit is moved to RBS.

The transceiver control in the GSM RBS then estimates the power to be used. If DTX is used, the transceiver control can include a DTX decrease in the estimate (typically an aggressive estimate). For instance, it can be assumed that DTX is used 30% of the time, giving a predicted power of 30% lower than just summing the expected power per carrier.

If the power is above the PA capabilities or the allowed power for one system, congestion control is applied, and the power is limited accordingly. Note that the estimate states the power per timeslot for the next and coming 8 time slots.

At step 202, it is checked whether a higher power than expected occur within a time slot which is within the time horizon, e.g. due to a DTX which did not happen, the GSM RBS has to take a local action to decrease the output power. This is done is step 204.

If a lower power than expected occur within a time slot within the time horizon, e.g. due to many DTX at the same time, the GSM RBS can update its estimate, with the hope that any of the other systems can make use of that power.

In step 204, if the GSM subsystem is over-using its share of the power amplifier, it needs to either remove a user or decrease the output power. Preferably, a GPRS transmission is removed or decreased in output power. The change then needs to be signalled to the packet control unit.

The power estimated in steps 200 and 202 is sent in step 206 to the power control circuit and the other subsystems. Note that the estimate states the power per timeslot for the next and coming 8 time slots. The start time of the GSM time slots are also sent to the other power control circuit.

At step 208, the data, possibly scaled to fit the power budget, is output to the power amplifier.

Accordingly, the behaviour of the power control circuit will now need to reduce the available power by the amount of power used by the GSM system. Each subsystem will need to use the GSM power in its calculations. For example, a 60 W power amplifier where the GSM has taken 22 W during a certain TTI, LTE is guaranteed 10 W, WCDMA 10 W and the share assigned to LTE is 33%, LTE is given:

$$10\ W + 0.33*(60\ W - 22\ W - 10\ W - 10\ W) = 10\ W + 0.33*18\ W = 16\ W$$

Note that the power calculation step can now be included in the TTI-based loop, giving a new power estimate for every new TTI to be scheduled. This allows updates of the information received from other subsystems to be included as quickly as possible.

When a subsystem 2 is calculating whether it is overpower (step 156 in FIG. 3), the latest demands that are received from other subsystems 2 and in particular the GSM RBS are taken into account which allows updates from GSM to be included as quickly as possible. It is for instance possible to schedule a few more users than first estimated as possible, and hoping that GSM will apply DTX leaving power headroom for the extra users.

GSM+LTE+WCDMA

With GSM, LTE and WCDMA subsystems 2, the algorithm can be further enhanced to utilize the shorter TTIs of the LTE system. With the previous algorithm, there could be unused power when the fluctuation of the GSM is high, due to that the WCDMA TTIs will need to adjust to the power envelope of the GSM carrier during the TTI period, see FIG. 7.

The GSM system operates according to the previous algorithm (FIG. 4).

The WCDMA subsystem extends its step 152 to also include sending the calculated power to the LTE subsystem. The calculated power shall be valid for the time period 2-4 ms ahead, i.e. the TTI just about to be scheduled.

If there are multiple asynchronous WCDMA subsystems, each WCDMA subsystem will need to send the intended power usage.

In step 156, the WCDMA system needs to check it fulfils the power usage transmitted to LTE in step 152.

The LTE subsystem 2 extends its calculation of its allowed power (step 152) to also include receiving power updates from the WCDMA subsystem 2. These are taken into account in calculating the allowed power, determining whether the LTE subsystem is overpower and any reduction in power required as well.

In effect, the LTE subsystem will be able to respond to changes in the GSM power quicker than the WCDMA subsystem, and so can fill any gaps between the power assigned to the WCDMA subsystem and the GSM RBS power that the WCDMA subsystem assignment was based upon.

It can therefore be seen that the present embodiments of the invention can allow very high utilization of the power amplifier. Furthermore, the embodiment provides very low dependencies between the systems, e.g. for new scheduling algorithms, new services, air interface changes. There is reduced risk of one subsystem starving another of power. A fair sharing of the power can be made based on current load and quality of service needs of each subsystem.

The invention claimed is:

1. A transmission apparatus comprising:
    a power amplifier, having an input and an output, the power amplifier operable to amplify signals input at the input and output the amplified signals at the output for onward transmission, the power amplifier being capable of amplifying input signals to a maximum power;
    a plurality of signal generating subsystems, each operable to provide, in use, a signal to be amplified to the input of the power amplifier; and
    a power control circuit, operable to assign a portion of the maximum power to each subsystem for amplification of each subsystem's signal;
    wherein each subsystem is operable to provide the power control circuit with a power demand indicative of the power required by that subsystem, wherein each power demand comprises at least two portions, each portion being indicative of power requested for transmitting a subset of the signals provided by that subsystem, and
    wherein the power control circuit is operable to vary the assignment of each subsystem's portion based upon the demands and to prioritize one of the portions from each of the subsystems over the others; and
    wherein the subsystems, in use, each implement one of a plurality of radio access networks such that at least two different radio access networks are implemented.

2. The apparatus of claim 1, wherein the signals of the subsystems each have a different baseband.

3. The apparatus of claim 1, wherein each subsystem is further operable to provide the power control circuit with a power demand by:
    determining a desired power based on traffic that subsystem is to transmit; and
    generating a power demand indicative of the desired power.

4. The apparatus of claim 1, wherein the power control circuit is operable to assign a minimum power to each subsystem.

5. The apparatus of claim 1, wherein each of the subsystems is operable to provide a demand by providing a demand that comprises a first portion, the first portion comprising at least one of an indication of power requested for control signaling to be transmitted by that subsystem and an indication of power requested for circuit-switched traffic to be transmitted by that subsystem, and wherein the power control circuit is operable to prioritize the first portions of the demand provided by each subsystem.

6. The apparatus of claim 5, wherein each of the demands provided by the subsystems further comprise a second portion, wherein the second portion comprises an indication of power requested for packet-switched data to be transmitted by that subsystem, and wherein the power control circuit is operable to prioritize power demands indicated in the first portions to those in the second portions.

7. The apparatus of claim 1, wherein the power control circuit is operable to attempt to fully assign the power indicated by the portion prioritized for each subsystem and to assign the remainder of the maximum power based upon the other portions.

8. The apparatus of claim 7, wherein the power control circuit is operable, if the total of all the powers indicated by the portions to which it gives priority are more than the maximum power, to send a maximum power exceeded indication to the subsystems.

9. The apparatus of claim 8, wherein the subsystems are operable, in response to the maximum power exceeded message, to apply congestion control to the signals provided by the subsystems, thereby reducing the amount of power to be used in transmitting the signals associated with the demands.

10. The apparatus of claim 1, wherein each subsystem is operable, if assigned less power than requested in the demand provided by that subsystem, to modify traffic to be transmitted by that subsystem to fit into the assigned power.

11. The apparatus of claim 1, wherein the subsystems are operable to provided demands to the power control circuit periodically and the power control circuit is operable to assign power to the subsystems periodically.

12. The apparatus of claim 11, wherein a period for providing demands and assigning power is less than 20 milliseconds.

13. The apparatus of claim 1, wherein the apparatus comprises a radio base station.

14. A method of amplifying signals for transmission, comprising:
    providing a power amplifier, the power amplifier being capable of amplifying input signals to a maximum power;
    providing a plurality of signal generating subsystems;
    generating, in each subsystem, a signal, wherein the subsystems each implement one of a plurality of radio access networks such that at least two different radio access networks are implemented;
    amplifying each signal using the power amplifier;
    generating in each subsystem a power demand indicative of the power required by that subsystem, wherein the power demand comprises at least two portions, each portion indicating power requested for transmitting a subset of the signals provided by a subsystem; and
    assigning and varying a portion of the maximum power to each subsystem based upon the demands, wherein assigning a portion of the maximum power to each subsystem comprises prioritizing one of the portions from each of the subsystems over the others.

15. The method of claim 14, further comprising determining a power for each subsystem based on traffic that subsystem is to transmit.

16. The method of claim 14, wherein generating a power demand further comprises:
    analyzing contents of a queue for data to be transmitted by the corresponding subsystem; and
    calculating, for each portion of the demand to be generated, an amount of power requested to transmit traffic in the queue associated with that portion of the demand.

17. The method of claim 16, further comprising:
    attempting to fully assign the power indicated by the prioritized portion of the demand generated each subsystem; and
    assigning the remainder of the maximum power based upon the other portions.

18. The method of claim 17, further comprising sending a maximum power exceeded indication to the subsystems if a total of the powers indicated by the prioritized portions are more than the maximum power.

19. The method of claim 18, further comprising applying congestion control to the signals provided by the subsystems in response to the maximum power exceeded message, thereby reducing the amount of power to be used in transmitting the signals associated with the demands.

20. The method of claim 14, further comprising modifying traffic to be transmitted by a subsystem to fit an assigned power if that subsystem is assigned less power than requested in the demand provided by that subsystem.

* * * * *

UNITED STATES PATENT AND TRADEMARK OFFICE
CERTIFICATE OF CORRECTION

PATENT NO. : 8,509,839 B2  Page 1 of 1
APPLICATION NO. : 13/122835
DATED : August 13, 2013
INVENTOR(S) : Österling It is certified that error appears in the above-identified patent and that said Letters Patent is hereby corrected as shown below:

In the Specification

In Column 10, Line 20, delete "is step" and insert -- in step --, therefor.

Signed and Sealed this
Seventeenth Day of December, 2013

Margaret A. Focarino
*Commissioner for Patents of the United States Patent and Trademark Office*